United States Patent
Farag et al.

(10) Patent No.: US 8,599,979 B2
(45) Date of Patent: Dec. 3, 2013

(54) INTERFERENCE CANCELLATION WITH A TIME-SLICED ARCHITECTURE

(75) Inventors: Emad Farag, Flanders, NJ (US);
Sridhar Gollamudi, Morris Plains, NJ (US); Robert Soni, Randolph, NJ (US)

(73) Assignee: Alcatel Lucent, Paris (FR)

( * ) Notice: Subject to any disclaimer, the term of this patent is extended or adjusted under 35 U.S.C. 154(b) by 39 days.

(21) Appl. No.: 13/453,318

(22) Filed: Apr. 23, 2012

(65) Prior Publication Data

US 2012/0207256 A1    Aug. 16, 2012

Related U.S. Application Data

(62) Division of application No. 12/379,024, filed on Feb. 11, 2009, now Pat. No. 8,306,164.

(51) Int. Cl.
| | |
|---|---|
| H04L 25/08 | (2006.01) |
| H04L 1/00 | (2006.01) |
| H03D 1/04 | (2006.01) |
| H03D 1/06 | (2006.01) |
| H03K 5/01 | (2006.01) |
| H03K 6/04 | (2006.01) |
| H04B 1/10 | (2006.01) |

(52) U.S. Cl.
USPC ........... 375/346; 375/260; 375/285; 375/316; 375/348

(58) Field of Classification Search
USPC .......................... 375/260, 285, 316, 346, 348
See application file for complete search history.

(56) References Cited

U.S. PATENT DOCUMENTS

| | | | |
|---|---|---|---|
| 6,088,383 A | 7/2000 | Suzuki et al. | |
| 6,137,788 A | 10/2000 | Sawahashi et al. | |
| 7,254,197 B2 | 8/2007 | Heo et al. | |
| 2004/0062302 A1 | 4/2004 | Fujii et al. | |
| 2004/0131134 A1 | 7/2004 | Hiroyasu | |
| 2008/0123719 A1* | 5/2008 | Lee et al. ...................... | 375/148 |

OTHER PUBLICATIONS

Notice of Allowance for U.S. Appl. No. 13/453,282 dated Jan. 10, 2013.
Notice of Allowance for U.S. Appl. No. 12/379,024 dated Jun. 22, 2012.

* cited by examiner

*Primary Examiner* — Ted Wang
(74) *Attorney, Agent, or Firm* — Harness, Dickey & Pierce (57) ABSTRACT

Example embodiments include methods of interference cancellation at NodeB receivers of baseband antenna signals including physical channels. The methods include canceling interference from a received baseband antenna signal by removing a reconstructed baseband signal from the processed received baseband antenna signal. The processed reconstructed baseband signal includes users whose physical data channel signals were successfully decoded. Methods also include removing interference from a received baseband signal to form an interference cancelled baseband signal that will be processed by the receiver. The interference cancelled baseband signal is the received baseband antenna signal minus users' signal interference contributions whose demodulated physical data channel signals have a determined user symbol energy value that exceeds a threshold. Methods further include removing interference from a user's signal to be error corrected. The interference is symbol interference from an earlier successfully decoded user's symbols. The user symbol interference is determined by cross correlations.

5 Claims, 11 Drawing Sheets

INTERFERENCE CANCELLATION WITH A TIME-SLICED ARCHITECTURE

CROSS-REFERENCE TO RELATED APPLICATIONS

This application is a divisional of U.S. application Ser. No. 12/379,024 filed Feb. 11, 2009 now U.S. Pat. No. 8,306,164, the contents of which are hereby incorporated by reference in their entirety.

BACKGROUND OF THE INVENTION

A cellular communications network typically includes a variety of communication nodes coupled by wireless or wired connections and accessed through different types of communications channels. Each of the communication nodes includes a protocol stack that processes the data transmitted and received over the communications' channels. Depending on the type of communications system, the operation and configuration of the various communication nodes can differ and are often referred to by different names. Such communications systems include, for example, a Code Division Multiple Access 2000 (CDMA2000) system and a Universal Mobile Telecommunications System (UMTS).

Third generation wireless communication protocol standards (e.g., 3GPP-UMTS, 3GPP2-CDMA2000, etc.) may employ a dedicated traffic channel in the uplink (e.g., a communication flow between a mobile station (MS) or User Equipment (UE), and a base station (BS) or NodeB). The dedicated channel may include a data part (e.g., a dedicated physical data channel (DPDCH) in accordance with UMTS Release 99/4 protocols, a fundamental channel or supplemental channel in accordance with CDMA2000 protocols, etc.) and a control part (e.g., a dedicated physical control channel (DPCCH) in accordance with UMTS Release 99/4 protocols, a pilot/power control sub-channel in accordance with CDMA2000 protocols, etc.). Release 5 of 3GPP introduces High Speed Downlink Packet Access (HSDPA), which is a high-speed downlink channel that has an associated control channel in the uplink (HS-DPCCH).

Newer versions of these standards, for example, Release 6 of UMTS provide for high data rate uplink channels referred to as enhanced dedicated channels (E-DCHs). An E-DCH may include an enhanced data part (e.g., an E-DCH dedicated physical data channel (E-DPDCH) in accordance with UMTS protocols) and an enhanced control part (e.g., an E-DCH dedicated physical control channel (E-DPCCH) in accordance with UMTS protocols).

Figure 1:
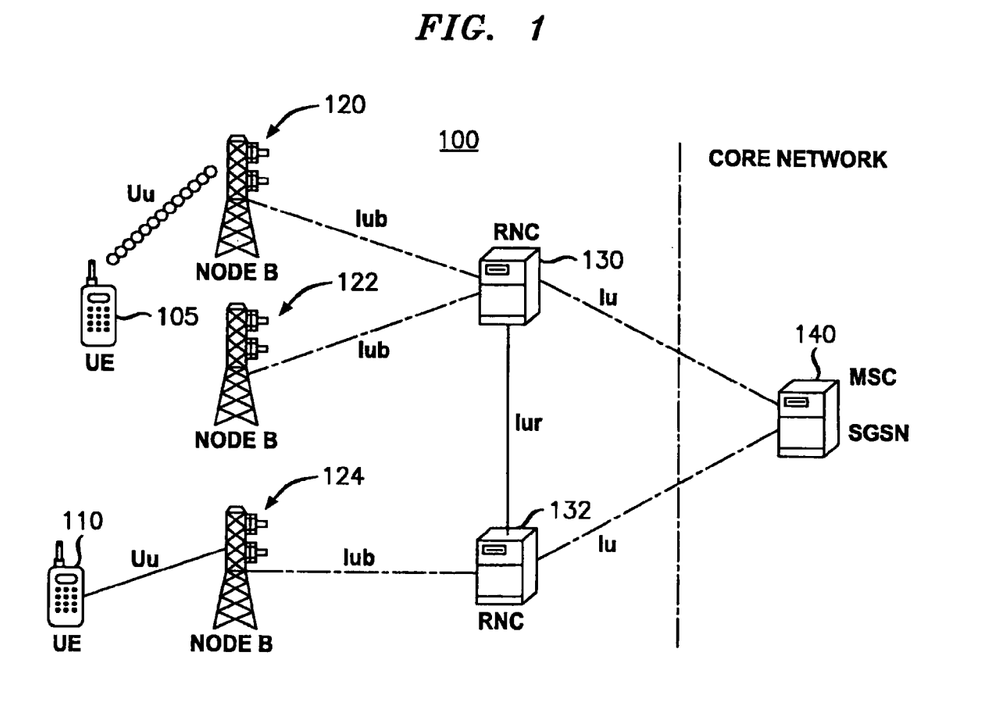
FIG. 1 illustrates a conventional wireless communication system operating in accordance with UMTS protocols.

FIG. 1 illustrates a conventional wireless communication system 100 operating in accordance with UMTS protocols. Referring to FIG. 1, the wireless communication system 100 may include a number of NodeBs such as NodeBs 120, 122 and 124, each serving the communication needs of a first type of user 110 and a second type of user 105 in their respective coverage area. The first type of user 110 may be a higher data rate user such as a UMTS Release 6 user, referred to hereinafter as an enhanced user. The second type of user may be a lower data rate user such as a UMTS Release 4/5 user, referred to hereinafter as a legacy user. The NodeBs are connected to an RNC such as RNCs 130 and 132, and the RNCs are connected to a MSC/SGSN 140. The RNC handles certain call and data handling functions, such as, autonomously managing handovers without involving MSCs and SGSNs. The MSC/SGSN 140 handles routing calls and/or data to other elements (e.g., RNCs 130/132 and NodeBs 120/122/124) in the network or to an external network. Further illustrated in FIG. 1 are interfaces Uu, Iub, Iur and Iu between these elements.

Figure 2A:
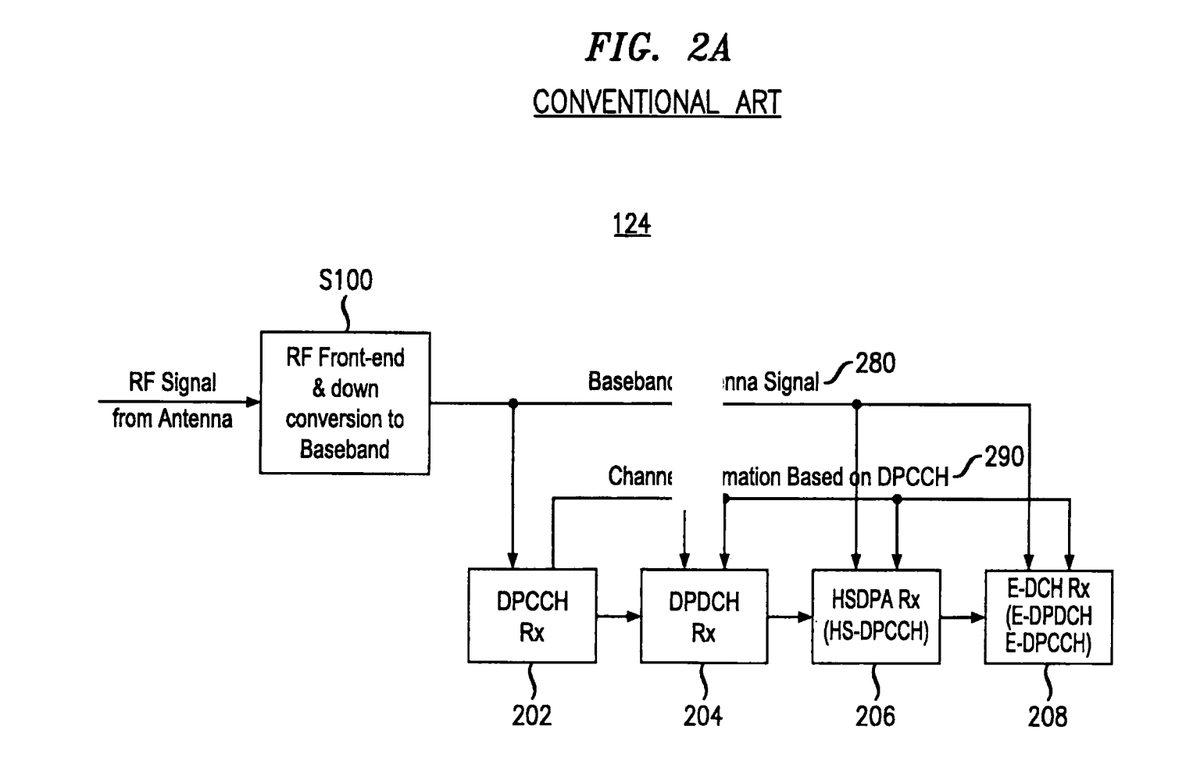
FIGS. 2A-2B illustrate example portions of a conventional uplink RF signal receiver.

An example frame for the E-DCHs (e.g., E-DPCCH and E-DPDCH) in the uplink direction may have a length of, for example, 10 milliseconds (ms). E-DCHs include E-DPDCH and E-DPCCH, which may each be code multiplexed. FIG. 2A illustrates a conventional UMTS uplink receiver 124 located at, for example, one of the NodeBs 120/122/124 of FIG. 1. The conventional receiver 124 of FIG. 2A may receive E-DCHs included in baseband antenna signal 280, which was front-end processed and down converted from the received antenna RF signal in step S100. Baseband antenna signal 280 is input to DPCCH, DPDCH, High Speed Data Packet Access (HSDPA), and E-DCH receivers, 202, 204, 206, and 208, respectively. As is well known, the DPCCH receiver 202 outputs channel estimates based on DPCCHs to receivers 204, 206, and 208.

Figure 2B:
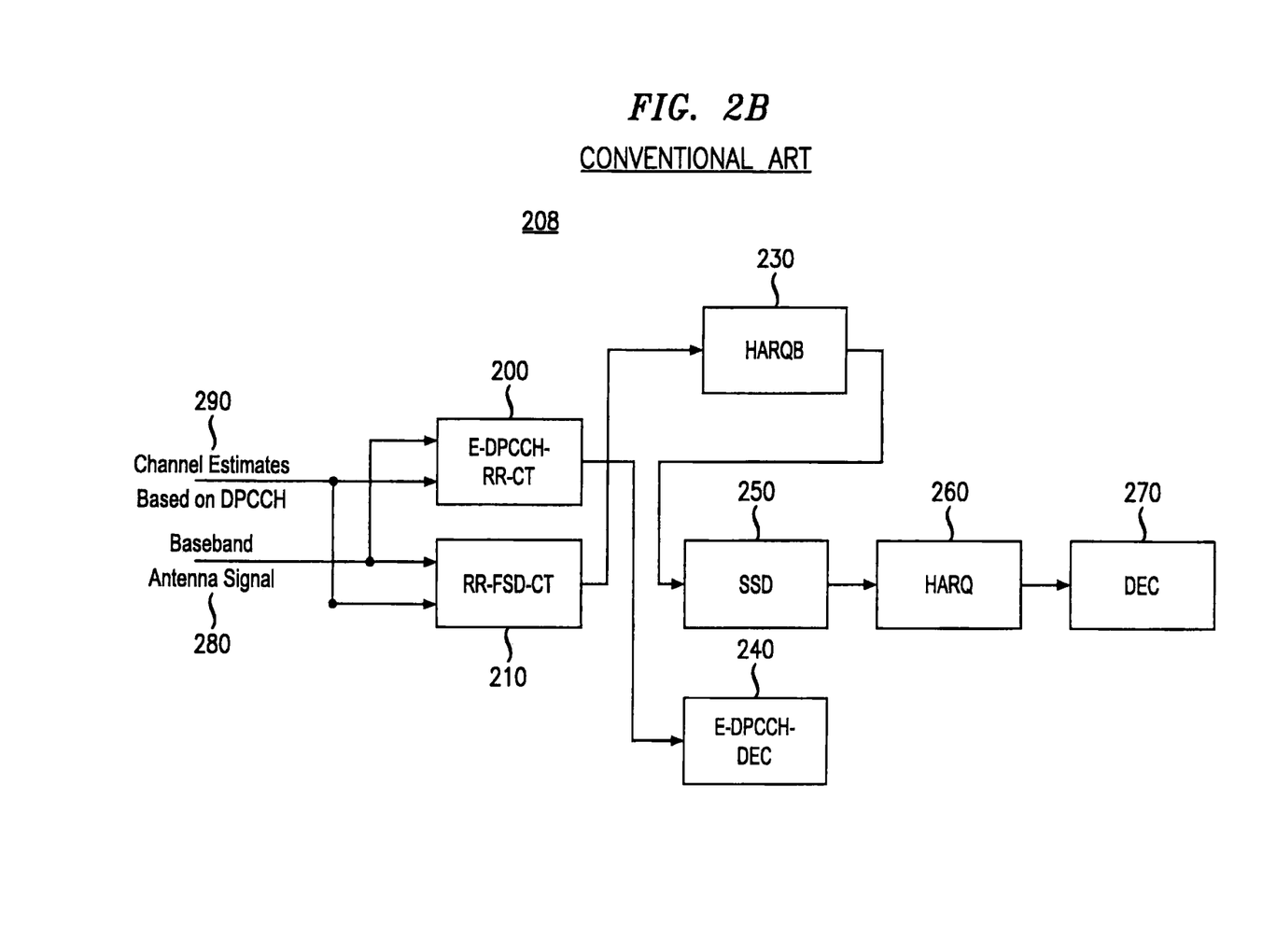

FIG. 2B illustrates a portion 208 of a conventional E-DCH receiver, 124 described in FIG. 2A, which may be implemented on an ASIC, FPGA, etc. The receiver portion 208 includes E-DPCCH-RR-CT block 200, RR-FSD-CT block 210, E-DPCCH-DEC block 240, HARQB block 230, SSD block 250, HARQ combiner block 260, and DEC block 270.

The conventional functions of the various blocks in FIG. 2B will be briefly discussed. To process physical control channel transmissions, E-DPCCH-RR-CT block 200 includes a rake receiver for combining multi-path components of the E-DPCCHs included in baseband antenna signal 280 using channel estimates 290. The thus processed user E-DPCCH transmissions are input to decoder E-DPCCH DEC block 240, for decoding. The use of "decode" in all its various forms is intended to indicate that decoding is attempted. The result of the attempted decoding is either indicated as "successful" or "unsuccessful" and is noted as such throughout. The structure and function of rake receivers are well known and thus will not be further described.

To process enhanced dedicated physical data channel transmissions, a rake receiver in RR-FSD-CT block 210 performs first stage despreading and then performs maximal rate combination (MRC) on the multi-path components of the E-DPDCH transmissions included in baseband antenna signal 280 using channel estimates 290. In block 210, the baseband antenna signal 280 is processed on a symbol by symbol basis, where each symbol is divided into equal time slices and each user is assigned a single time slice per symbol. The duration and/or length of a symbol may vary and may be set by network properties. For example, each DPCCH symbol equals approximately 66.7 µsec or 256 chips and may be transmitted over a Transmission Time Interval (TTI) or frame. For example, common TTI for E-DCHs are, for example, 10 ms or 2 ms.

Returning back to FIG. 2B, the first stage processed E-DPDCH symbols are buffered in HARQB block 230, which may be externally located from block 205, e.g., on a different part of the board or chip, etc., or may be embedded with the other identified blocks. First despread symbols are output from the HARQB block 230 in TTIs for each user and input to SSD block 250, in which the symbols are further despread, deinterleaved, and rate dematched. The second stage processed symbols for each user are combined in HARQ combiner block 260 and finally decoded in Dec block 270.

As is well known, the baseband antenna signal 280 includes multiple user signals, each user signal including a first transmission and/or a retransmission. The retransmission results from the Dec block 270 not successfully decoding a user's earlier transmission or retransmission as a result of inadequate error detection (e.g., signal to interference ratio). If a decoder is unable to decode a user's transmission, the un-decoded transmission is discarded and a Negative Acknowledge (NACK) response is sent to the transmitter by the receiver requesting the transmitter retransmit the user's signal. Various types of error correction and decoding may be used. For example, HARQ combining and decoding are well known processes that accomplish the above by retransmitting the user's transmission having the same data but possibly a different encoding pattern. Also well know are interleaving, rate matching, Turbo encoding, convolution coding, and CRC attachment.

Figure 3:
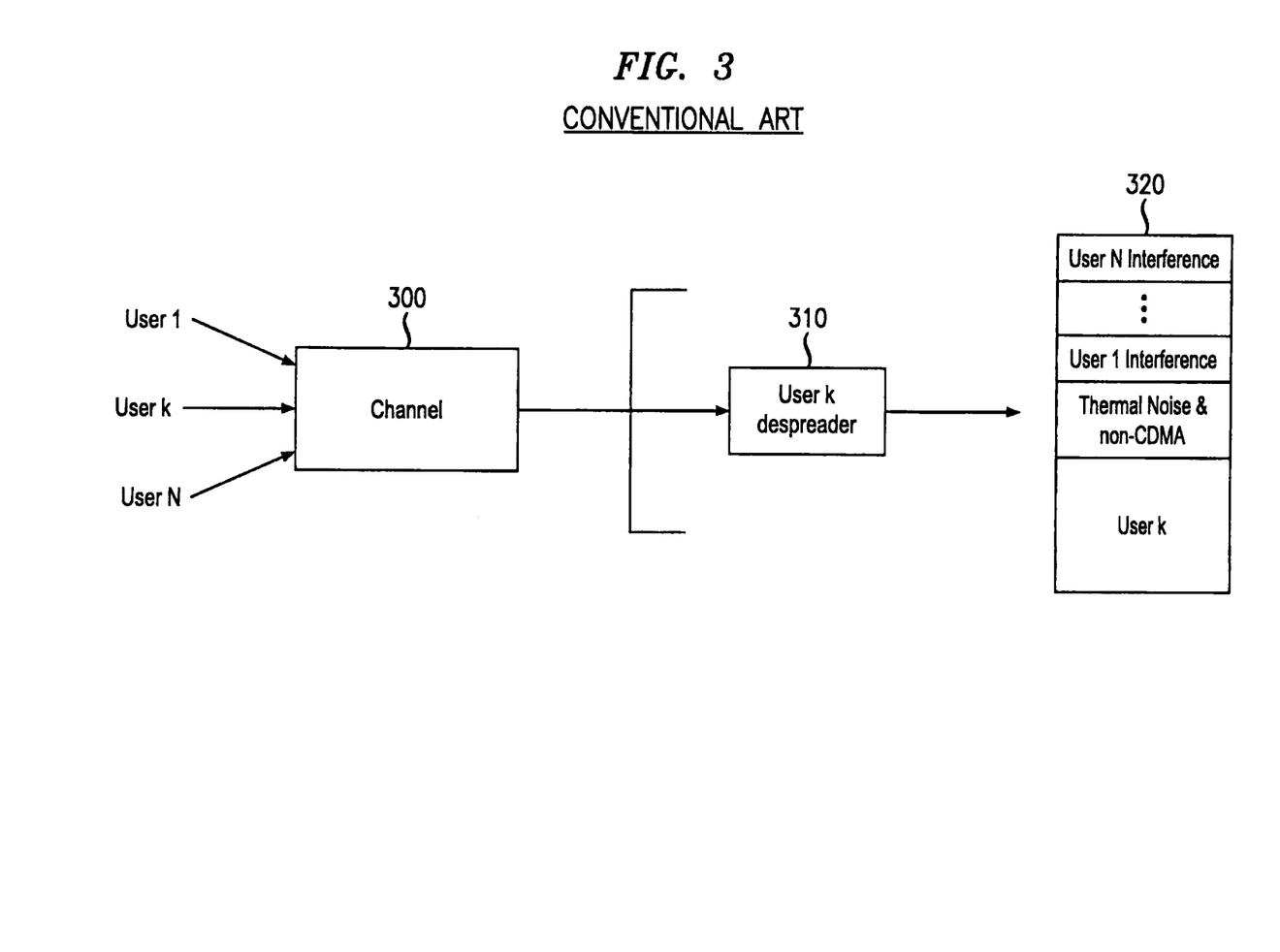
FIG. 3 illustrates the conventional concept of signal interference.

As shown in FIG. 3, multi-user interference occurs when multiple users are transmitted in the uplink in the same frequency band and at the same time using quasi-orthogonal codes. For example, channel 300 of FIG. 3 includes users 1 to N including user k. Focusing on user k as an example of a user signal, when user k's signal is despread by despreader 310, the resulting signal 320 includes interference from all of the other user signals (e.g., user N to user 1), thermal noise, non-WCDMA interference (e.g., other sources of man-made or natural interference), and user k's signal. To reduce the effect of interference, a user's signal's power may be increased, but increasing a user's signal power does not normally help as once one user increases his power, the other users follow suit. However, removing (or canceling) other users' interference has been found to enhance cell capacity.

Figure 4A:
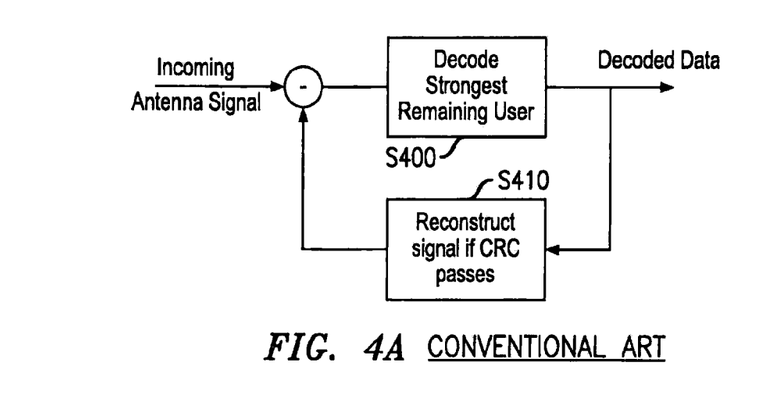
FIGS. 4A-4B illustrate conventional methods of interference cancellation.

Two well known types of interference cancellation include successive interference cancellation and parallel interference cancellation. FIG. 4A illustrates an example of successive interference cancellation and FIG. 4B illustrates an example of parallel interference cancellation.

In FIG. 4A the strongest user signal of an incoming baseband antenna signal is decoded at step S400 and if decoded successfully, the decoded user signal is reconstructed and subtracted at step S410 from the baseband signal. This process is repeated for the next strongest user and is continued for a determined number of users.

Figure 4B:
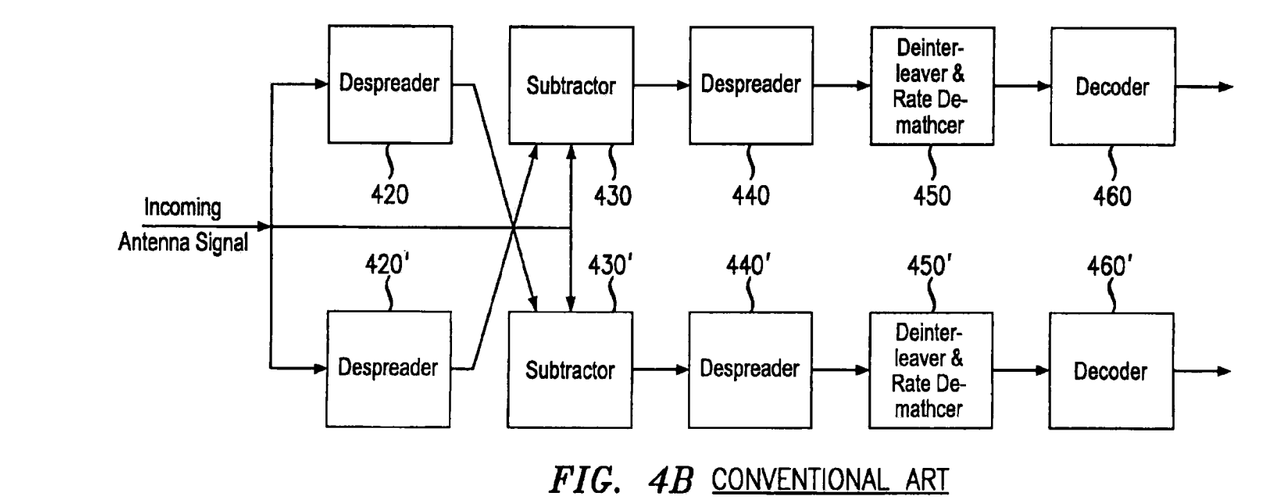

In FIG. 4B, all user signals of an incoming baseband antenna signal are detected simultaneously and coarse estimates are made for each user signal. The coarse estimates are subtracted from the other user signals to cancel interference. For example, in FIG. 4B two user signals are detected simultaneously and coarse estimates for each user's signal is determined in Despreaders 420 and 420'. Each coarse estimated user signal is then subtracted from the other user signals in Subtractors 430 and 430'. Following the subtraction, the user signals are process through another Despreader 440 or 440', Deinterleaver and Rate De-matching block 450 or 450', and decoded at Decoder 460 or 460'. As will be obvious to one of ordinary skill in the art, these two methods of interference cancellation may be used in systems with more than two users.

SUMMARY OF THE INVENTION

Example embodiments provide methods, logical flows, and architectures designed to cancel interference at NodeB receivers. Example embodiments act on baseband antenna signals, including dedicated physical control and data channels and/or enhanced physical control and data channels, which are processed in time sliced architectures. By canceling interference in physical channels, enhanced capacity due to an increase in successful decoding of the physical channels may be achieved.

An example embodiment provides a method of decoding physical channels, comprising, receiving a multi-user baseband antenna signal at a receiver. The multi-user baseband antenna signal including physical channel transmissions, including transmissions on physical data channels and physical control channels. The method further demodulates received physical data channel signal transmission. The demodulating step may include at least despreading and maximal ratio combining multi-path components of the received baseband antenna signal. Demodulating is also performed on previous physical data channel transmissions of unsuccessfully decoded users included in a delayed interference cancelled multi-user baseband antenna signal. The demodulation step includes at least despreading and maximal ratio combining of multi-path components of the delayed multi-user interference cancelled baseband antenna signal.

In another example embodiment, physical control channel transmissions are demodulated and combined with previous interference cancelled physical control channel transmissions, similar to the method of physical data channel transmissions. The physical control channel transmissions and the previous interference cancelled physical control channel transmissions are demodulated symbol by symbol, each symbol being divided into equal time slices where each user is assigned a single time slice per symbol. The method also includes combining the demodulated physical data channel transmissions and the demodulated previous interference cancelled physical data channel transmissions.

The method may further include error correcting the combined demodulated transmissions and decoding the error corrected transmission. Also, the error correction may include HARQ combining. All steps of the method may be repeated as new multi-user baseband antenna signals are received. The use of the combined transmissions in error correction and decoding increase the success of decoding previously unsuccessfully decoded users.

Other example embodiments provide methods of interference cancellation, comprising, receiving a multi-user baseband antenna signal at a receiver including physical channel transmissions. The physical data channel transmissions are demodulated, the demodulation may include the steps of at least first stage despreading and maximal ratio combining multi-path components of the received baseband antenna signal. Demodulation may also include at least second despreading, deinterleaving, and rate de-matching the first demodulated received physical data channel transmissions. The method further includes error correcting the received demodulated physical data channel transmissions for each and decoding the error corrected user transmissions. The error correction may include HARQ combining and the decoder may be a Turbo decoder. If a transport block for a user is successfully decoded the transport block is re-encoded and a reconstructed baseband antenna signal is reconstructed from the re-encoded user transport block. The user signal reconstructed from the transport block may also use multi-path profile and associated channel estimates to form a reconstructed baseband antenna signal for that user, the reconstructed baseband antenna signal is combined with that of other users and removed from the received baseband antenna signal.

A second multi-user baseband antenna signal may then be received at the receiver and demodulated in a similar way as discussed above. The previous physical data channel transmissions included in the delayed interference cancelled baseband antenna signal are also demodulated and these demodulated transmissions are then combined to form an aggregate signal for each previous user. Following the combining step, the aggregate signal for each user is decoded.

The above example embodiment methods may be repeated as often as determined by the number of users that are unsuccessfully decoded and/or as determined by network/system conditions. The physical data channels may be enhanced physical data channels. The received multi-user baseband antenna signal may be stored in at least one buffer and the interference cancelled delayed baseband antenna signal may be stored in a buffer.

Example embodiments also include methods of interference cancellation, including receiving a multi-user baseband antenna signal at a receiver, the multi-user baseband antenna signal including at least physical data channel transmissions. The method further demodulates the physical data channel transmissions, which may include at least first stage despreading and maximal ratio combining multi-path components of the received baseband antenna signal. A user symbol energy value is determined for at least one user of the multi-users based on the demodulated user physical data channel transmissions, where if the user's symbol energy exceeds a threshold, a physical data channel signal for the at least one user is reconstructed at a chip rate corresponding to the determined user's symbol energy. To cancel interference, the reconstructed physical data channels are removed from the multi-user baseband antenna signal to form an interference cancelled baseband antenna signal.

The method may further include using the interference cancelled baseband antenna signal plus the user's removed interference for each user whose reconstructed physical data channels were removed from the multi-user baseband signal, and using the interference cancelled baseband signal for each user who was not removed from the multi-user baseband antenna signal for further processing by the receiver.

Example embodiments also include methods of interference cancellation, including error correcting a demodulated physical data channel transmission for a first user at a receiver and decoding the combined user signal. If the first user's transmission is successfully decoded, the decoded transmission is re-encoded and the interference of the re-encoded first user transmission on other users is determined. The determined interference is removed from a second user's transmission. These steps may be repeated for all users who are successfully decoded. The determined interference may be determined symbol interference, and the error correction may be HARQ combining. Various error correcting processes/methods may be chosen, for example, interleaving, rate matching, HARQ combining, Turbo, convolution coding, CRC attachment, etc. The interference determining may use pre-computed cross correlations of scrambling and spreading codes or by computing the cross correlations on the fly, along with multi-path profiles and channel estimates.

Additional example embodiments include combinations of the various example embodiments discussed above to further increase successful decoding.

BRIEF DESCRIPTION OF THE DRAWINGS

Example embodiments will be more clearly understood from the following detailed description taken in conjunction with the accompanying drawings. FIGS. 1-9 represent non-limiting, example embodiments as described herein.

DETAILED DESCRIPTION OF THE EMBODIMENTS

Various example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. As used herein, the term "and/or" includes any and all combinations of one or more of the associated listed items. The terminology used herein is for the purpose of describing particular embodiments only and is not intended to be limiting of example embodiments. As used herein, the singular forms "a," "an" and "the" are intended to include the plural forms as well, unless the context clearly indicates otherwise.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the present invention and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a selfconsistent sequence of steps leading to a desired result. The steps are those requiring physical manipulations of physical quantities.

Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

As used below the terms base station, base transceiver station (BTS) and NodeB are synonymous and may be used interchangeably to describe equipment that provides data connectivity between a wireless network and one or more UEs. Additionally where used below, the terms user, user equipment (UE), subscriber, mobile station, and remote station are synonymous and may be used interchangeably to describe a remote user of wireless resources in a wireless communication network. Also, the methods, logical flows, and architectures described may apply to any and all antennas and sectors. In addition, while the methods, logical flows, and architectures are described using aligned users, non-aligned users may be used as well.

As discussed above with regard to FIG. 1, a multi-user environment may include at least a first type of user 110, which may be a higher data rate user such as a UMTS Release 6 user, referred to herein as an enhanced user, and a second type of user 105, which may be a lower uplink data rate user such as a UMTS Release 4/5 user, referred to herein as a legacy user. Enhanced users 110 transmit signals to a serving NodeB 120/122/124 simultaneously over E-DCHs (e.g., E-DPDCHs and E-DPCCHs), DCHs (e.g., DPDCHs and DPCCHs), and HS-DPCCHs. Legacy users 105 transmit signals over DCHs, and HS-DPCCHs. As discussed above, these enhanced and legacy dedicated physical channels may be transmitted over respective propagation channels, each of which may include multiple propagation paths.

Figure 5:
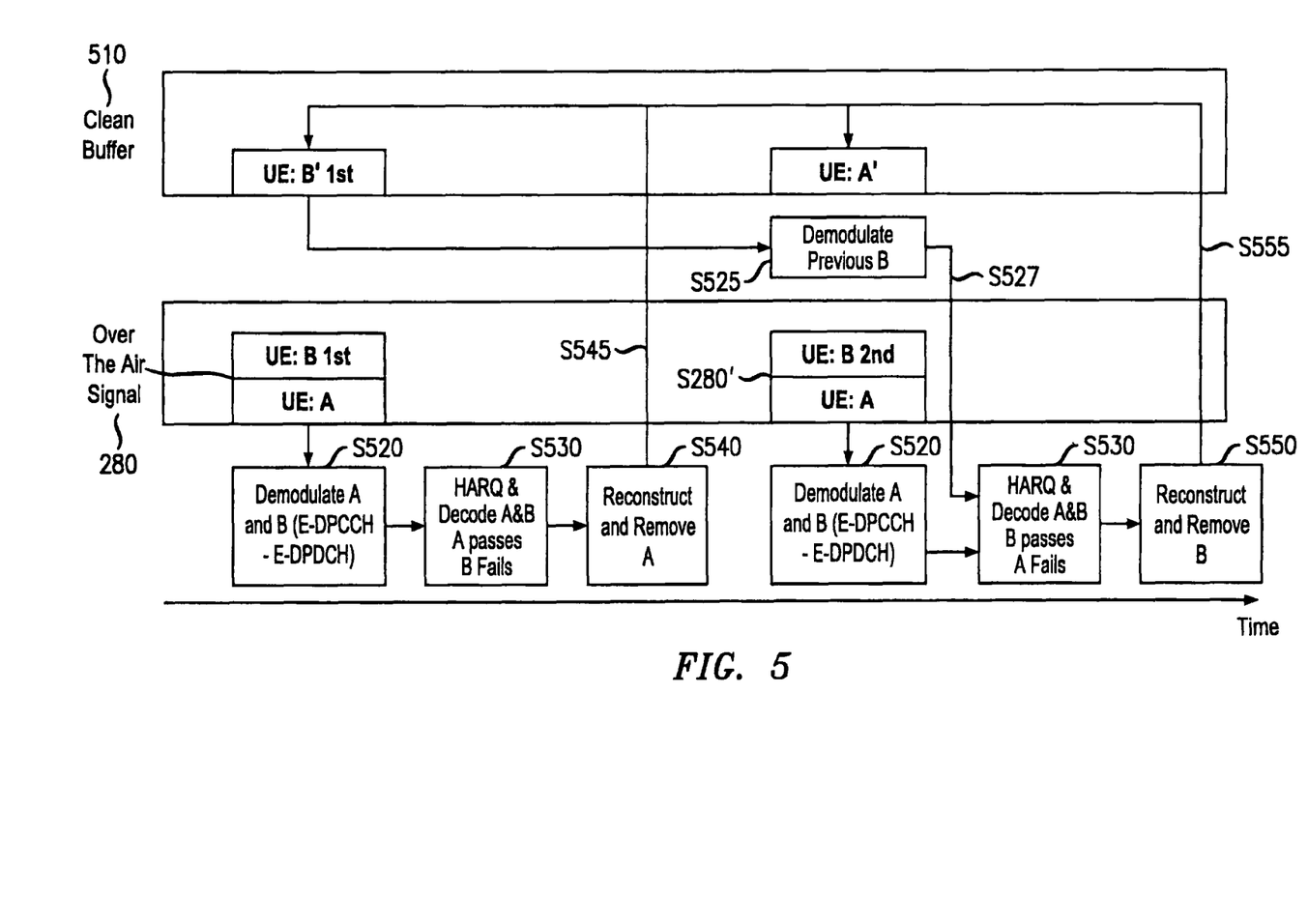
FIG. 5 illustrates an interference cancellation method, according to example embodiments.
Figure 6A:
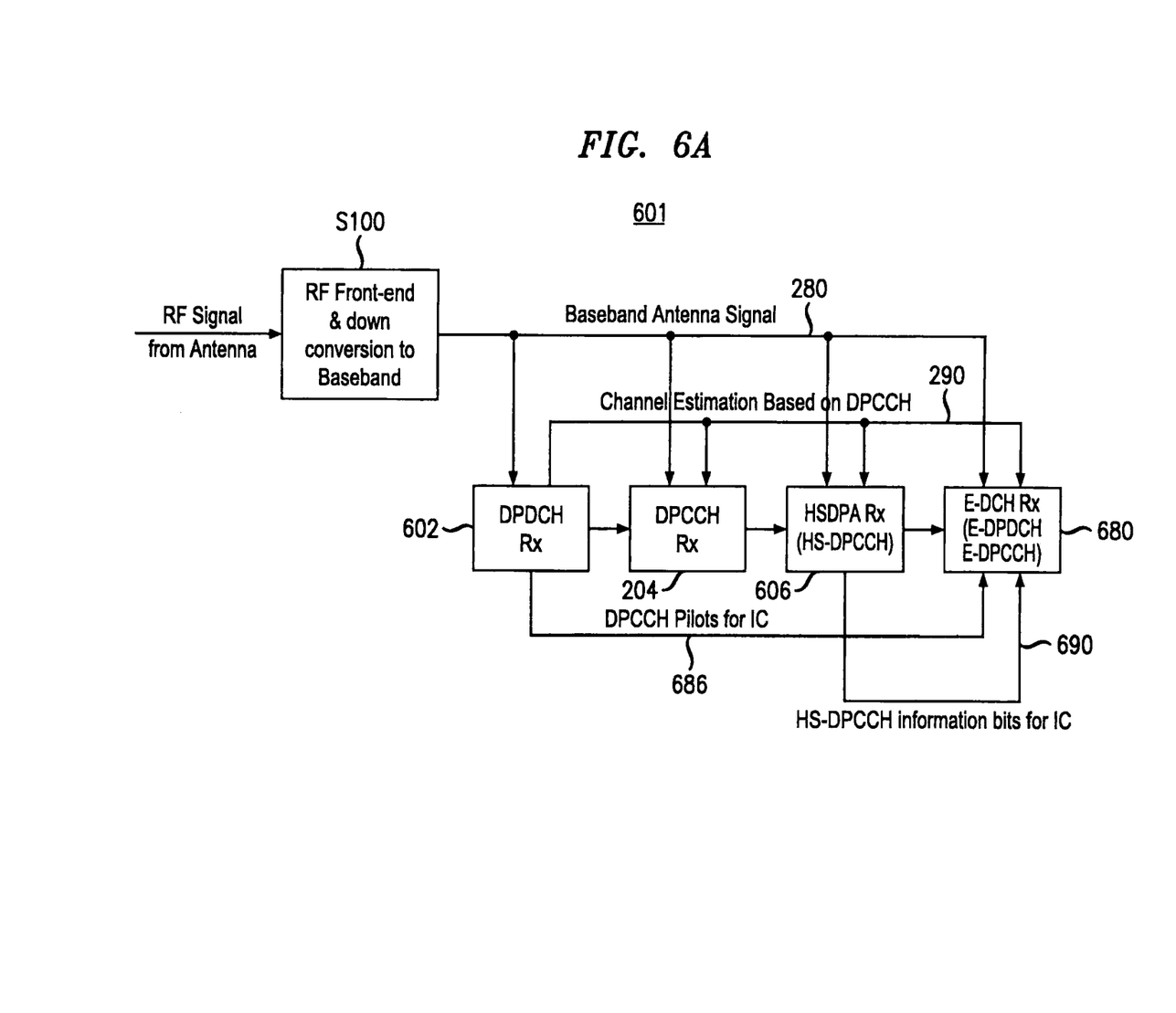
FIG. 6A shows a portion of a NodeB receiver and logical flows, according to example embodiments.

FIG. 5 illustrates a method of interference cancellation of a physical data channel according to an example embodiment of the present invention. FIG. 6A illustrates an overview of a modified NodeB receiver shown in FIG. 2A. FIG. 6A further includes DPCCH receiver 602 outputting DPCCH pilots 686 to E-DCH receiver 680 and HSDPA receiver 606 outputting HS-DPCCH information bits 690 to E-DCH receiver 680. These additional inputs are used as described below for interference cancellation according to example embodiments. Receiver 680 may be located at, for example, any or all of the NodeBs 120/122/124 shown in FIG. 1. For exemplary purposes, example embodiments of the present invention will be discussed with regard to the conventional wireless system shown in FIGS. 1-2B. However, it is understood that example embodiments of the present invention may be implemented in conjunction with any suitable wireless telecommunications network (e.g., UMTS, CDMA2000, etc.).

For purposes of example, FIG. 5 illustrates a first over the air baseband antenna signal 280 comprising two user signals (signal 280 may include more than two users). In FIG. 5, baseband antenna signal 280 includes a transmission for UE A and a first transmission ($1^{st}$) for UE B on a physical data channel. Signal 280 is demodulated in step S520 and HARQ combined with previous transmissions, if any, and decoded in step S530 as shown on the left side of FIG. 5. Step S520 may occur in blocks 210 and 230, for the E-DPDCHs and at block 200 for the E-DPCCHs, as previously described in FIG. 2B. Step S530 occurs at SSD and HARQ blocks 250, 260, and Dec block 270, also previously described for the E-DPDCHs in FIG. 2B. Following successful decoding of user A as shown in FIG. 5, user A's signal is reconstructed and removed from first signal 280 to produce an interference cancelled baseband antenna signal compromising user B's transmission ($1^{st}$), in this example, (shown as UE B $1^{st}$) in step S540. User B's transmission included in the interference cancelled baseband antenna signal is also referred to as a previous transmission for user B (in the future) and is stored in ICB block 510, which is a "clean" buffer in step S545. The stored transmission has had some interference removed and in this example is equivalent to a delayed interference cancelled baseband antenna signal. The delayed interference cancelled baseband antenna signal may include more than one user, and more than one user's transmission may be removed from the received baseband antenna signal 280 to form the delayed interference cancelled baseband antenna signal.

As shown on the right side of FIG. 5, a second over the air baseband antenna signal 280' is received, at a later time. Second signal 280' includes a retransmission for UE B and an initial transmission for UE A. Essentially the same demodulating process S520 is performed on the second signal 280' as discussed above. However, prior to the second signal 280' being HARQ combined at step S530, the delayed interference cancelled baseband antenna signal, in this example, is equivalent to UE B $1^{st}$ and is demodulated in step S525. In step S527, the demodulated delayed interference cancelled baseband antenna signal UE B $1^{st}$ and the demodulated second signal 280' are combined in HARQ combiner 260 and decoded in DEC 270. The delayed interference cancelled baseband antenna signal containing UE B $1^{st}$ has had interference removed, and therefore successful decoding of UE B's transport blocks increases. A transport block is a block of data sent over one TTI and a transmission is an instance of a block of data sent from a transmitter to a receiver.

FIG. 5 also shows that user B is successfully decoded and user A is not in step S530. Therefore, in step S550, user B's transmission is reconstructed and removed from second baseband antenna signal 280' to produce an interference cancelled baseband antenna signal UE A', which contains user's A transmission, also referred to as a previous transmission for user A (in the future). The interference cancelled baseband signal UE A' is stored in ICB block 510 in step S555. The interference cancellation process shown in FIG. 5 may be performed for more users and/or as necessary to ensure successful decoding of users' transmissions.

Figure 6B:
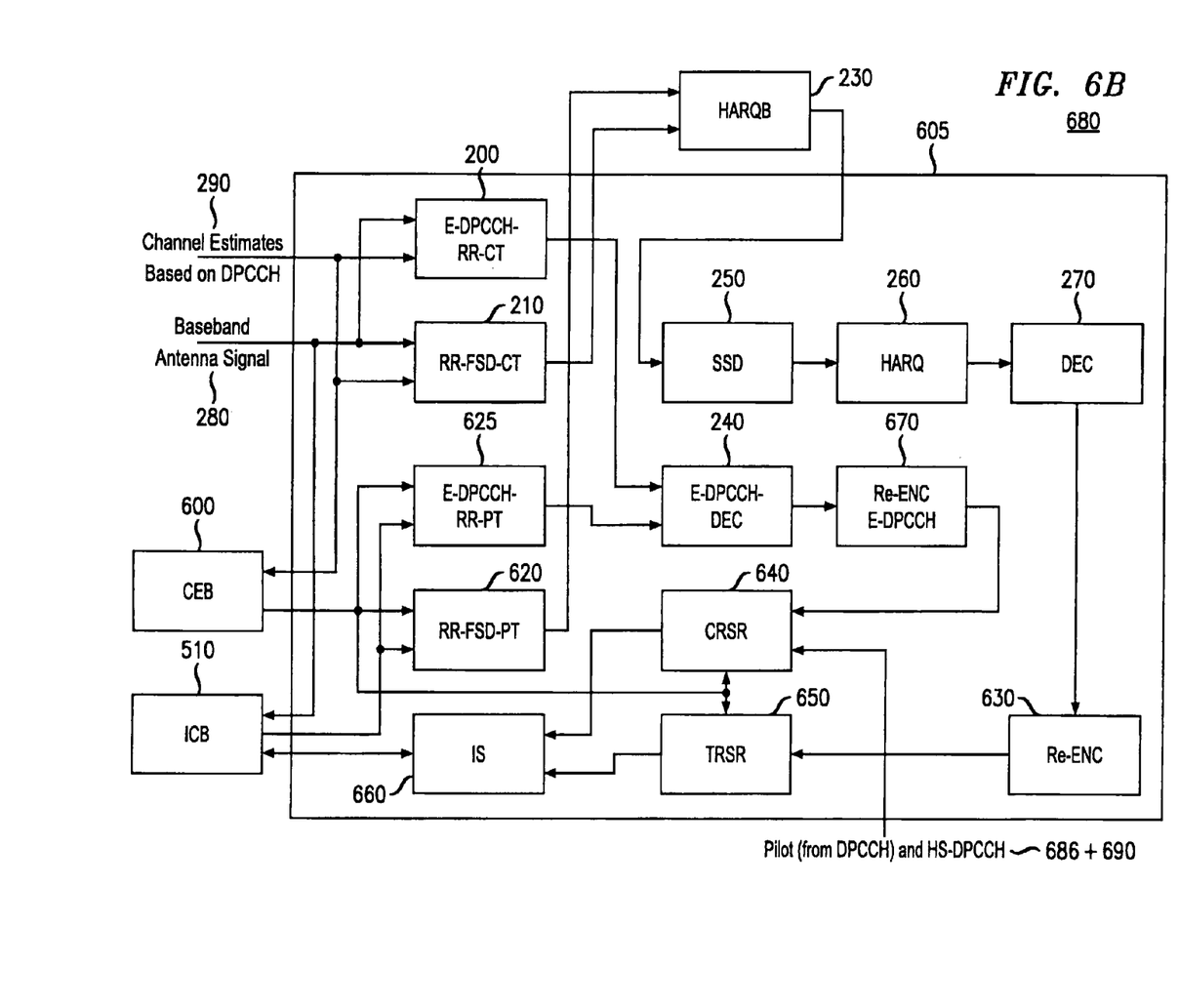
FIG. 6B illustrates further detail, of block 680 of FIG. 6A.

The method shown in FIG. 5 and the additional inputs shown in FIG. 6A are further described with reference to FIG. 6B. FIG. 6B includes all of the blocks of FIG. 2B and additional blocks, Re-ENC 630, Re-ENC-E-DPCCH 670, CRSR 640, TRSR 650, IS 660, ICB 510, CEB 600, E-DPCCH_R-R_PT 625, and RR-FSD-PT 620. The blocks and their corresponding function shown in FIG. 2B have been described and thus the focus will be on the new blocks and their functions.

In FIG. 6B, the baseband antenna signal 280 is received at block 510, block 200, and block 210. ICB block 510 is an interference cancelled buffer, also referred to as a "clean buffer" in FIG. 5. Channel estimates 290 are received at block 600 and block 200 and 210. CEB block 600 is a channel estimation buffer. ICB block 510 and CEB block 600, for example, may be external memories or embedded memories, similar to HARQB 230 discussed above. As shown in FIG. 5, ICB block 510 may store incoming baseband antenna signals and interference cancelled baseband antenna signals, while CEB block 600 may store channel estimates and rake finger delay information.

As shown in FIG. 6B, each users' physical data channel transmissions (of the same transport block) that are successfully decoded are re-encoded in Re-ENC block 630 and the corresponding control channels are re-encoded in RE-ENC-E-DPCCH block 670. The re-encoded physical data signals are reconstructed at TRSR block 650 as described with respect to steps S540 and S550 of FIG. 5. Similarly, the re-encoded physical control signals are reconstructed at CRSR block 640 during step S540 of FIG. 5. The output of CRSR block 640 and TRSR block 650 are combined to form a reconstructed baseband antenna signal at IS block 660, including signals from all successfully decoded users that were transmitted at the same time. Therefore the reconstructed baseband signal may include one user, a portion of the users, or almost all the users based on how many users were successfully decoded. As shown in FIG. 5, the reconstructed baseband antenna signal first included UE A's successfully decoded transmissions and then UE B's successfully decoded transmissions in the second reconstructed baseband antenna signal.

Also at IS block 660 during step S540, the reconstructed baseband antenna signal is subtracted from first baseband antenna signal 280, which was previously stored in ICB block 510. The result is the delayed interference cancelled baseband antenna signal discussed in FIG. 5 to be used with users who were not successfully decoded, also referred to as the previous transmission for these users.

The reconstructed baseband signal may include every successfully decoded user, and the subtraction or removal of the reconstructed baseband signal removes these decoded users in a batch process, as compared to removing the users one by one, sequentially. For example, the users that are transmitted at the same time and successfully decoded, have there signals reconstructed in a time-sliced manner, e.g., by symbols. The reconstructed signals for all users are then added together by symbols and subtracted (as one group) from the received baseband antenna signal. The delayed interference cancelled baseband antenna signal is then stored in ICB 510 as described in FIG. 5 in step S545.

The interference cancellation method continues as described in FIG. 5 by receiving a second baseband antenna signal 280'. The process for second reconstructed baseband antenna signal 280' is the same as for first baseband antenna signal 280, except prior to HARQ combining and decoding, the delayed interference cancelled baseband antenna signal containing the previous transmissions for the unsuccessfully decoded users (UE B $1^{st}$ in FIG. 5) is also demodulated in step S525. FIG. 6B includes the following blocks that demodulate the delayed interference cancelled baseband antenna signal, similarly named blocks function in the same way as previous described. In FIG. 6B, E-DPCCH-RR-PT 625 functions the same as E-DPCCH-RR-CT but on the previous transmission (PT) as compared to the current transmission (CT), RR-FSD-PT block 620 functions the same as RR-FSD-CT, HARQB block 230 and SSD block 250 are the same.

The demodulated transmissions for the same user are combined in HARQ combiner block 260 and decoded by DEC 270 in step S530. As shown in FIG. 5, an example may include UE A's signal not being successfully decoded, whereas UE B's signal is successfully decoded in step S530. In this example, UE B's signal is then reconstructed and removed from the second signal 280' in step S550 producing a delayed interference cancelled baseband antenna signal containing the previous transmission corresponding to UE A, which is stored in ICB 510 in step S555.

The above described interference cancellation processes may be repeated as often as necessary and for and with as many users as necessary. By canceling the interference in a received baseband antenna signal and using the formed delayed interference cancelled baseband antenna signal in combination with a new received baseband antenna signal, successful decoding of user's retransmissions, will increase. It is noted that for each successfully decoded transport block, the previous user transmissions may all be interference cancelled or a portion of the user transmissions may be interference cancelled.

Figure 7:
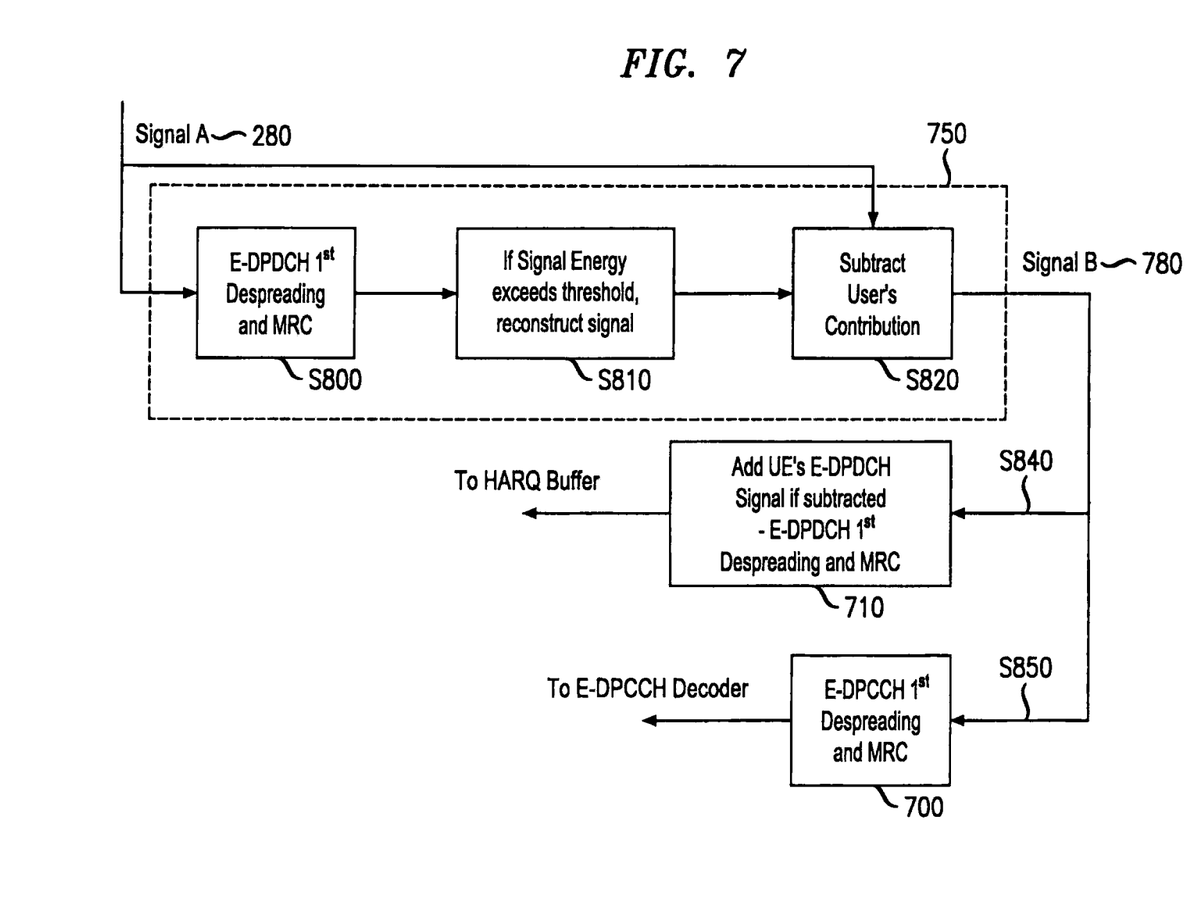
FIG. 7 illustrates an interference cancellation method, logical flow, and architecture, according to example embodiments.

FIG. 7 illustrates another method of interference cancellation according to example embodiments. The blocks illustrated in FIG. 7 are the same shown in, for example, a portion of FIG. 2B, but block 750 is added prior to block 710 (modified block 210) and block 700 (modified block 200). As shown in FIG. 7, a multi-user baseband antenna signal 280 is input to block 750 including physical data channel transmissions, e.g., E-DPDCH. In step S800, the received multi-user baseband antenna signal is demodulated, for example, at least first stage despreading and MRCing are performed. The demodulation is performed symbol by symbol and in step S810, a user symbol energy value is determined for each user's symbol. The determined user symbol energy value is compared to a threshold in step S810 and users with a determined user symbol energy value exceeding the threshold are reconstructed using the chip rate at the user's symbol. The threshold user symbol energy value may be set by the service/network provider in view of network parameters and/or system requirements, and propagation environments. In step S820, all reconstructed user signals are removed and/or subtracted from baseband antenna signal 280 forming an interference cancelled baseband antenna signal 780.

In steps S840 and S850, for each user, either interference cancelled signal 780 combined with the specific user's reconstructed user signal, or the interference cancelled signal 780 is input to blocks 710 and 700, respectively, to continue processing at the receiver. For example, the interference cancelled signal 780 may be input (S840 and S850) to blocks 710 and 700 for each user whose determined user symbol energy value did not exceed the threshold and/or was not subtracted, whereas a combination of the interference cancelled signal 780 and the user's reconstructed user signal may be input (S840 and S850) to block 710 and 700 for each user whose determined symbol energy value did exceed the threshold and/or was subtracted.

Figure 8:
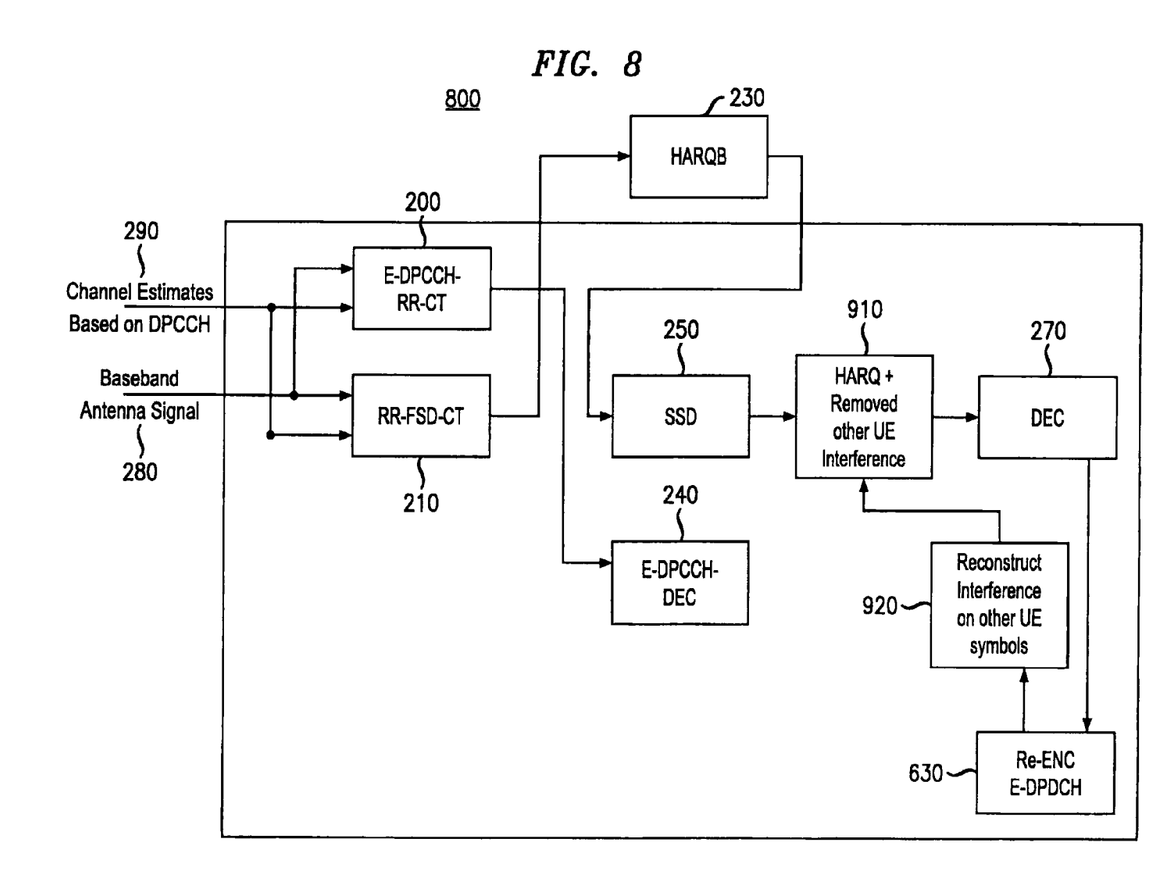
FIG. 8 illustrates an example interference cancellation receiver architecture, logical flow, and method, according to example embodiments.

FIG. 8 illustrates another method of interference cancellation according to example embodiments. The blocks illustrated in FIG. 8 are the same as shown in, for example, FIG. 2B, but blocks 910 and 920 are substituted for block 260, and block 630 (as shown in FIG. 6B) has been added. The method and architecture shown in FIG. 8 use a re-encoded user physical data channel transmission to determine the interference effect of the re-encoded user on another user's symbols transmitted at the same time, and to then cancel the determined interference effect from the another user's symbols being decoded.

As discussed with reference to FIGS. 5 and 6A-B, a user's physical data channel transmission is re-encoded at Re-ENC 630 if the user's physical data channel transmission was successfully decoded at DEC block 270. As discussed before, error correction may refer to, for example, interleaving, rate matching, HARQ combining, etc., and decoding may refer to Turbo decoding as well as other decoding chain functions. In FIG. 8, the re-encoded user's physical data channel transmission is input into block 920, where the re-encoded user's interference on the next user is determined. This can be for the current transmission as well as for previous transmissions. The next user may include each user whose physical data channel transmission was transmitted at the same time as the re-encoded user's. The determined interference may include the interference from the re-encoded user's symbols. The determined interference is then input into block 910. In block 910 the next user's post despread physical data channel transmissions are HARQ combined (although various forms of error correction may be used as discussed above) and the determined interference is removed. This process may be additive, for example, successfully decoded users' determined interference could be combined and removed from the next user's transmissions. However, any unsuccessfully decoded users would obviously not be included in the determined interference as they would not be re-encoded.

The determined interference for a user may be determined by using the cross correlation between the user's and the next user's scrambling codes for all symbols and all possible symbol offsets. For example the cross correlation may be stored in a look-up table or computed on the "fly" using multi-path profile and channel estimates.

The example embodiment methods and architectures discussed above may be combined in various ways to further enhance interference cancellation and successful decoding of received baseband signals. For example, FIG. 9 illustrates a combination of the example embodiment methods and architecture shown in FIGS. 5, 6B, and 8.

Figure 9:
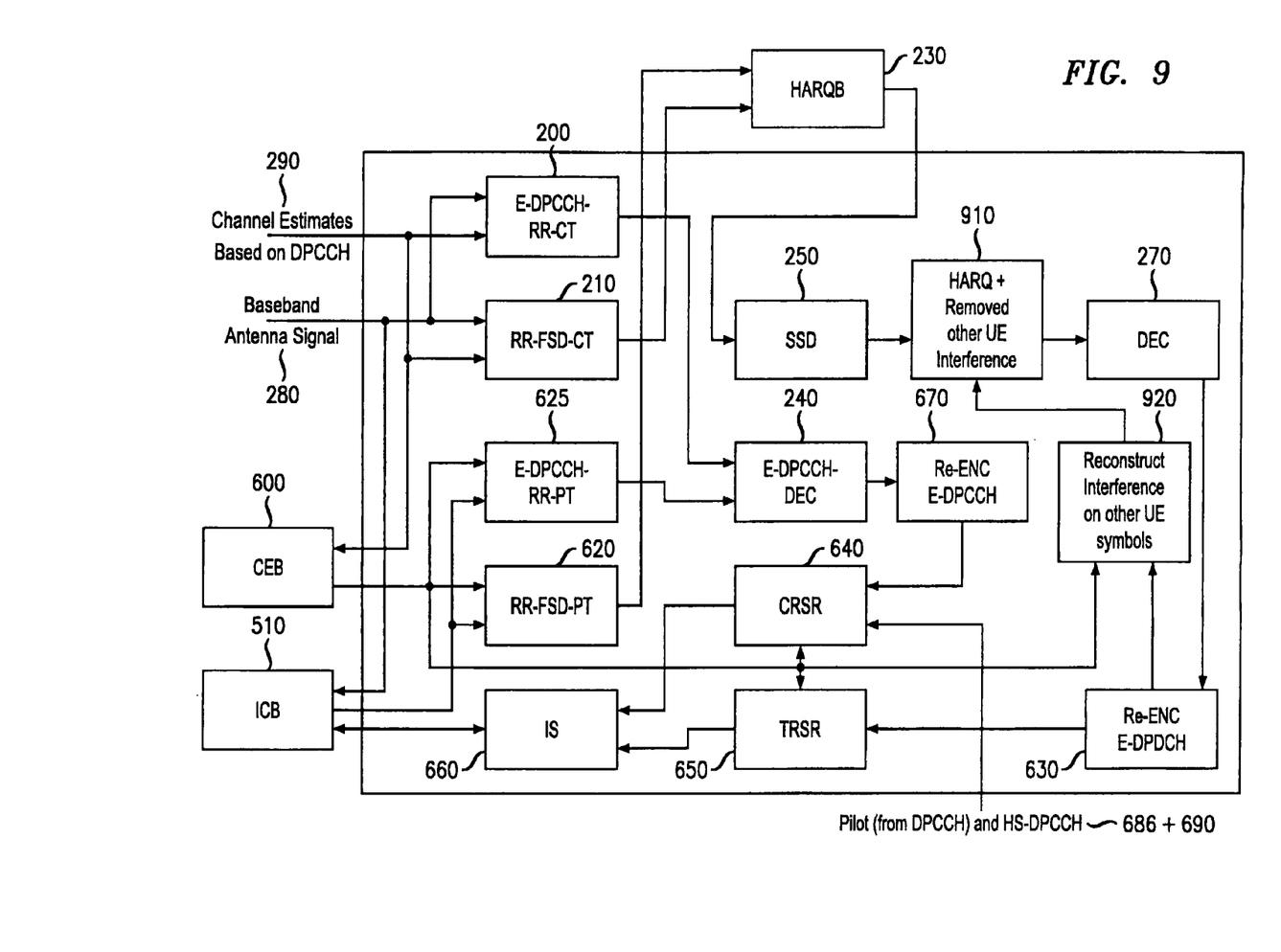
FIG. 9 illustrates an example interference cancellation receiver architecture, logical flows, and method for combining FIG. 6 and FIG. 8, according to example embodiments.

In FIG. 9, the HARQ block 260 of FIG. 6B is replaced with previously described blocks 910 and 920 and the Re-ENC block 630 inputs to block 920 as well as block 650. Therefore, the baseband antenna signal processing includes removing determined symbol interference of one user on other users transmitted in the same baseband signal 280 as described in FIG. 8; and storing a delayed interference cancelled baseband signal to process and combine with a second baseband antenna signal 280' as described in FIGS. 5 and 6B.

Other combinations are also possible. For example, block 750 of FIG. 7 may be added to the architecture of FIG. 6B before blocks 210 and 200, or before blocks 210, 200, 620, and 625. Therefore, the method described in FIGS. 5 and 6A-B would use either an interference cancelled baseband signal 780 combined with the user's reconstructed signal, or the interference cancelled baseband signal 780 (which is a function of 280) as inputs to blocks 210 and 200 as indicated in FIG. 7; or a further interference cancelled delayed interference cancelled baseband signal (which is a function of the delayed interference cancelled baseband signal stored in ICB 510), or the further interference cancelled delayed interference cancelled baseband signal combined with the user's reconstructed signal as inputs to blocks 610 and 620.

Additionally, the architectures and methods of FIGS. 7 and 8 may be combined. For example, block 750 may be added before blocks 200 and 210 of FIG. 8. However, to use both types of interference cancellations on one baseband antenna signal 280, a first subset of the transmitted users' signals would be interference cancelled as a result of processing in block 780 and a second subset of the transmitted users' signals would be interference cancelled as a result of processing in blocks 920 and 910. The first subset of users and the second subset of users being exclusive of each other. Also the architectures and methods of FIGS. 5, 6A-B, 7, and 8 may all be combined. For example, FIG. 7 may be added to FIG. 9 as described with reference to adding FIG. 7 to FIGS. 5 and 6A-B and FIG. 7 to FIG. 8. The same rules regarding the subset of users would apply to this combination as described with reference to combining FIGS. 7 and 8, but any subset, including users in both identified subsets could be interference cancelled through the method described in FIGS. 5 and 6A-B.

One or more example embodiments of the present invention provide improved system performance, for example, reduced interference between users, increased cell capacity, increased data throughput, etc.

Example embodiments of the present invention being thus described, it will be obvious that the same may be varied in many ways. Such variations are not to be regarded as a departure from the invention, and all such modifications are intended to be included within the scope of the invention.

We claim:

1. A method of interference cancellation, comprising:
receiving a multi-user baseband antenna signal at a receiver, the multi-user baseband antenna signal including physical channel transmissions;
demodulating the physical data channel transmissions;
determining a user symbol energy value for each of the multiple users based on the demodulated transmissions; and
removing a reconstructed signal for each user with a determined symbol energy value exceeding a threshold, from the multi-user baseband antenna signal to form an interference cancelled baseband antenna signal.

2. The method of claim 1, wherein the demodulating step further includes:
partially despreading and maximal ratio combining multi-path components of the multi-user baseband antenna signal.

3. The method of claim 1 further comprising:
reconstructing a signal for each user of the multiple users having a determined user symbol energy value exceeding a threshold, the reconstructed signal being reconstructed at the chip rate of the user's symbol.

4. The method of 1, further comprising:
processing at the receiver for each user of the multi-user baseband antenna signal, wherein the processing input for each user is either,
(a) the interference cancelled baseband antenna signal, or
(b) a combination of the interference cancelled baseband antenna signal and the previously removed reconstructed signal for this user,
wherein for each user whose determined symbol energy value did not exceed the threshold, (a) is input, and for each user whose determined symbol energy value exceeded the threshold, (b) is input.

5. The method of claim 4, wherein the processing step further includes,
- error correcting a demodulated input for a first user;
- decoding the error corrected first user input;
- re-encoding the successfully decoded first user input;
- determining an interference of the first user on other users; and
- removing the determined interference from a demodulated input for a second user, forming an interference cancelled input for the second user, wherein the users that have determined symbol energy values exceeding the threshold are mutually exclusive from the users who are re-encoded.

* * * * *